(12) United States Patent
Hatano et al.

(10) Patent No.: US 7,537,634 B2
(45) Date of Patent: May 26, 2009

(54) METHOD FOR MANUFACTURING PLUGGED HONEYCOMB STRUCTURE

(75) Inventors: Tatsuhiko Hatano, Kasugai (JP); Masahiro Masuda, Inuyama (JP); Yukihito Ichikawa, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 513 days.

(21) Appl. No.: 11/374,991

(22) Filed: Mar. 15, 2006

(65) Prior Publication Data

US 2006/0213164 A1    Sep. 28, 2006

(30) Foreign Application Priority Data

Mar. 23, 2005 (JP) .............................. 2005-084920
Jan. 16, 2006 (JP) .............................. 2006-007669

(51) Int. Cl.
*B01D 46/00* (2006.01)
*F01N 3/022* (2006.01)

(52) U.S. Cl. .................... 55/523; 55/282.3; 55/385.3; 55/DIG. 5; 55/DIG. 10; 55/DIG. 30; 60/311; 95/273; 264/44; 264/628; 264/630; 264/631; 264/DIG. 48; 428/116

(58) Field of Classification Search ........... 55/282.2, 55/282.3, 385.3, 523, 524, DIG. 5, DIG. 10, 55/DIG. 30; 60/303, 311; 95/273; 264/43, 264/44, 628, 630, 631, DIG. 48; 428/116, 428/117, 118

See application file for complete search history.

(56) References Cited

U.S. PATENT DOCUMENTS

| | | | | | |
|---|---|---|---|---|---|
| 4,411,856 | A | * | 10/1983 | Montierth | 264/630 |
| 5,021,204 | A | * | 6/1991 | Frost et al. | 264/630 |
| 5,259,190 | A | * | 11/1993 | Bagley et al. | 55/523 |
| 6,673,300 | B2 | * | 1/2004 | Allen et al. | 55/523 |
| 6,699,428 | B2 | * | 3/2004 | Nishi et al. | 264/630 |
| 7,090,714 | B2 | * | 8/2006 | Otsubo et al. | 55/523 |
| 7,259,120 | B2 | * | 8/2007 | Ellison et al. | 55/523 |
| 2004/0131772 | A1 | * | 7/2004 | Yamada et al. | 264/177.12 |

FOREIGN PATENT DOCUMENTS

| | | | |
|---|---|---|---|
| JP | 2001-300922 | * | 10/2001 |
| JP | A 2001-300922 | | 10/2001 |

* cited by examiner

*Primary Examiner*—Jason M Greene
(74) *Attorney, Agent, or Firm*—Oliff & Berridge, PLC

(57) ABSTRACT

A method for manufacturing a plugged honeycomb structure includes the steps of: applying a predetermined amount of the plugging slurry on a face of an end face sealing member, one end face of the masked honeycomb structure is pressed against the face to which the plugging slurry was applied of the end face sealing member to fill the plugging slurry in the predetermined cells on the one end face side, and drying at least the plugging slurry at a portion in contact with the face of the end face sealing member in a state that the face of the end face sealing member is pressed against the one end face of the masked honeycomb structure. The method can manufacture simply at a low cost a plugged honeycomb structure with reduced accumulation of deposit on an end face when the honeycomb structure is used as a filter or the like.

16 Claims, 12 Drawing Sheets

(PRIOR ART)

(PRIOR ART)

METHOD FOR MANUFACTURING PLUGGED HONEYCOMB STRUCTURE

BACKGROUND OF THE INVENTION AND RELATED ART STATEMENT

The present invention relates to a method for manufacturing a plugged honeycomb structure. More particularly, the present invention relates to a method for manufacturing a plugged honeycomb structure, the method being capable of manufacturing simply at a low cost a plugged honeycomb structure in which an amount of deposit on the end face is reduced when it is used as a filter or the like.

In recent years, there have been used ceramic plugged honeycomb structures excellent in thermal resistance and corrosion resistance as filters for collecting dust used for an environmental measure such as antipollution and for recovery of products from high temperature gas in various fields such as chemistry, electric power, steel, and industrial waste disposal. For example, such a plugged honeycomb structure is suitably used as a dust-collecting filter used at high temperature in a corrosive gas atmosphere, such as a diesel particulate filter (DPF) for trapping particulate discharged from a diesel engine (see JP-A-2001-300922).

As shown in FIG. 17, a plugged honeycomb structure used as a dust-collecting filter as described above is provided with a cylindrical honeycomb structure 23 having porous partition walls 22 separating and forming a plurality of cells 24 functioning as fluid passages and a plugging member 26 for plugging one opening of each of predetermined cells and the other opening of each of the remaining cells. In the plugged honeycomb structure 21 shown in FIG. 17, the plugging member 26 is plugging alternatively on the inlet side end face B and the outlet side end face C of the cells 24.

In the case of using the plugged honeycomb structure 21 having such a structure as a DPF or the like, once target gas ($G_1$) is introduced from the inlet side end face B into a cell 24, dust and particulate is trapped by the partition walls 22, and the gas permeates through the porous partition walls 22 and flow in the adjacent cell 24 to give treated gas ($G_2$), which is discharged from the outlet side end face C. Therefore, the treated gas ($G_2$) having no dust and particulate which was separated from the target gas ($G_1$) can be obtained.

The plugged honeycomb structure 21 as described above can be manufactured by preparing a cylindrical unfired honeycomb structure having porous partition walls separating and forming a plurality of cells functioning as fluid passages by extrusion forming, filling plugging slurry containing ceramic in one opening of each of predetermined cells of the unfired honeycomb structure obtained or a fired honeycomb structure obtained by firing the unfired honeycomb structure and the other opening of the remaining cells, and firing the honeycomb structure.

However, in the case of manufacturing such a plugged honeycomb structure in a conventional manufacture method, as shown in FIG. 18, a depression 25 toward inside the honeycomb structure 23 from an end face is formed on an end face of the plugging member 26 on an end face side of the plugged honeycomb structure 21. Such a depression 25 is generally called a "shrunk dent". For example, when the plugged honeycomb structure 21 is used as a filter such as a DPF, deposit (particulate matter) such as soot accumulates on the depression 25, and there arises the problem that the deposit serves as a core, and deposit easily accumulates on the end face of the plugged honeycomb structure 21.

In addition, though a measure (not illustrated) for flattening an end face of the plugging member having a depression by filling plugging slurry again for the plugged honeycomb structure having the depression the an end face of the plugging member, there arise the problems that the complex manufacture processes raise the cost of manufacture, that, since the plugging member is not unitarily formed, the plugging member filled in the depression later is peeled off due to thermal stress, or the like, and that damage is caused at the portion.

SUMMARY OF THE INVENTION

According to the present invention, there is provided a method for manufacturing a plugged honeycomb structure, the method being capable of manufacturing simply at a low cost a plugged honeycomb structure in which an amount of deposit on the end face is reduced when it is used as a filter or the like.

The present invention provides the following method for manufacturing a plugged honeycomb structure and plugged honeycomb structure.

[1] A method for manufacturing a plugged honeycomb structure comprising the steps of:

subjecting a ceramic forming raw material to extrusion forming to obtain a cylindrical unfired honeycomb structure having porous partition walls separating and forming a plurality of cells functioning as fluid passages, filling plugging slurry containing ceramic in one opening of each of predetermined cells of the unfired honeycomb structure or a fired honeycomb structure obtained by firing the unfired honeycomb structure and in the other opening of each of the remaining cells to obtain a plugged honeycomb structure precursor, and firing the plugged honeycomb structure precursor to obtain a plugged honeycomb structure;

wherein a mask covering the opening of each of cells other than the predetermined cells is disposed on one end face of the unfired honeycomb structure or the fired honeycomb structure at least when the plugging slurry is filled in one opening of each of the predetermined cells of the unfired honeycomb structure or the fired honeycomb structure to obtain a masked honeycomb structure, a predetermined amount of the plugging slurry is applied on a face of an end face sealing member having a predetermined face size and limiting motion of the plugging slurry inside the predetermined cells by bringing the face into contact with the one end face of the masked honeycomb structure when the plugging slurry is filled in the opening of each of the predetermined cells, and the one end face of the masked honeycomb structure is pressed against the face, to which the plugging slurry was applied, of the end face sealing member to fill the plugging slurry in the predetermined cells on the one end face side, and at least the plugging slurry at a portion in contact with the face of the end face sealing member is dried in a state that the face of the end face sealing member is pressed against the one end face of the masked honeycomb structure to obtain the plugged honeycomb structure precursor.

[2] A method for manufacturing a plugged honeycomb structure comprising the steps of:

subjecting a ceramic forming raw material to extrusion forming to obtain a cylindrical unfired honeycomb structure having porous partition walls separating and forming a plurality of cells functioning as fluid passages, filling plugging slurry containing ceramic in one opening of each of predetermined cells of the unfired honeycomb structure or a fired honeycomb structure obtained by firing the unfired honeycomb structure and in the other opening of each of the remaining cells to obtain a plugged honeycomb structure precursor, and firing the plugged honeycomb structure precursor to obtain a plugged honeycomb structure;

wherein a mask covering the opening of each of cells other than the predetermined cells is disposed on one end face of the unfired honeycomb structure or the fired honeycomb structure at least when the plugging slurry is filled in one opening of each of the predetermined cells of the unfired honeycomb structure or the fired honeycomb structure to obtain a masked honeycomb structure, and after the plugging slurry is filled in the predetermined cells on the one end face side in the masked honeycomb structure, at least the plugging slurry at a portion in contact with the face of the end face sealing member is dried in a state that the face of the end face sealing member having a predetermined face size and limiting motion of the plugging slurry inside the predetermined cells by bringing the face into contact with the one end face of the masked honeycomb structure is pressed against the one end face of the masked honeycomb structure to obtain the plugged honeycomb structure precursor.

[3] A method for manufacturing a plugged honeycomb structure according to [1] or [2], wherein the end face sealing member is removed from the plugged honeycomb structure precursor after the plugging slurry at a portion in contact with the face of the end face sealing member is dried.

[4] A method for manufacturing a plugged honeycomb structure according to [1] or [2], wherein the end face sealing member is burnt up using the end face sealing member constituted by a flammable substance when the plugged honeycomb structure precursor is fired.

[5] A method for manufacturing a plugged honeycomb structure according to [4], wherein the mask covering the opening of each of the cells other than the predetermined cells is burnt up together with the end face sealing member when the plugged honeycomb structure precursor is fired.

[6] A method for manufacturing a plugged honeycomb structure according to any one of [1] to [5], wherein the end face sealing member has flexibility and a shape of a sheet.

[7] A method for manufacturing a plugged honeycomb structure according to any one of [1] to [6], wherein the end face sealing member has a bottomed cylindrical shape with an open top face.

[8] A method for manufacturing a plugged honeycomb structure according to any one of [1] to [7], wherein the plugging slurry contains a pore former.

[9] A method for manufacturing a plugged honeycomb structure according to any one of [1] to [8], wherein the plugging slurry has a viscosity of 100 to 1500 dPa·s.

[10] A plugged honeycomb structure comprising:
a cylindrical honeycomb structure having porous partition walls separating and forming a plurality of cells functioning as fluid passages, and a plugging member plugging an opening of each of the predetermined cells and the other opening of each of the remaining cells;

wherein the plugging member is unitarily constituted in every opening of the cells to be plugged independently, and the plugging member has a flat end face on at least one end face of the honeycomb structure or, even if a depression toward inside the honeycomb structure from one end face is formed on an end face of the plugging member, the depth of the depression is 1 mm or less.

[11] A plugged honeycomb structure according to [10], wherein, even on the other end face side of the honeycomb structure, the end face of the plugging member is flat or, if a depression toward inside the honeycomb structure from one end face is formed on an end face of the plugging member, the depth of the depression is 1 mm or less.

Thus, according to a method for manufacturing a plugged honeycomb structure of the present invention, a plugged honeycomb structure with reduced accumulation of deposit on an end face can be manufactured simply at a low cost. In addition, a plugged honeycomb structure of the present invention has reduced accumulation of deposit at an end face.

DETAILED DESCRIPTION OF THE INVENTION

Embodiments of a method for manufacturing a plugged honeycomb structure (first and second aspect of the inventions) and a plugged honeycomb structure (third invention) is hereinbelow described in detail with referring to drawings. However, the present invention is construed limitedly to these embodiments, and various kinds of change, modification, and improvement may be given based on knowledge of those skilled in the art as long as it does not deviating from the present invention.

Figure 1:
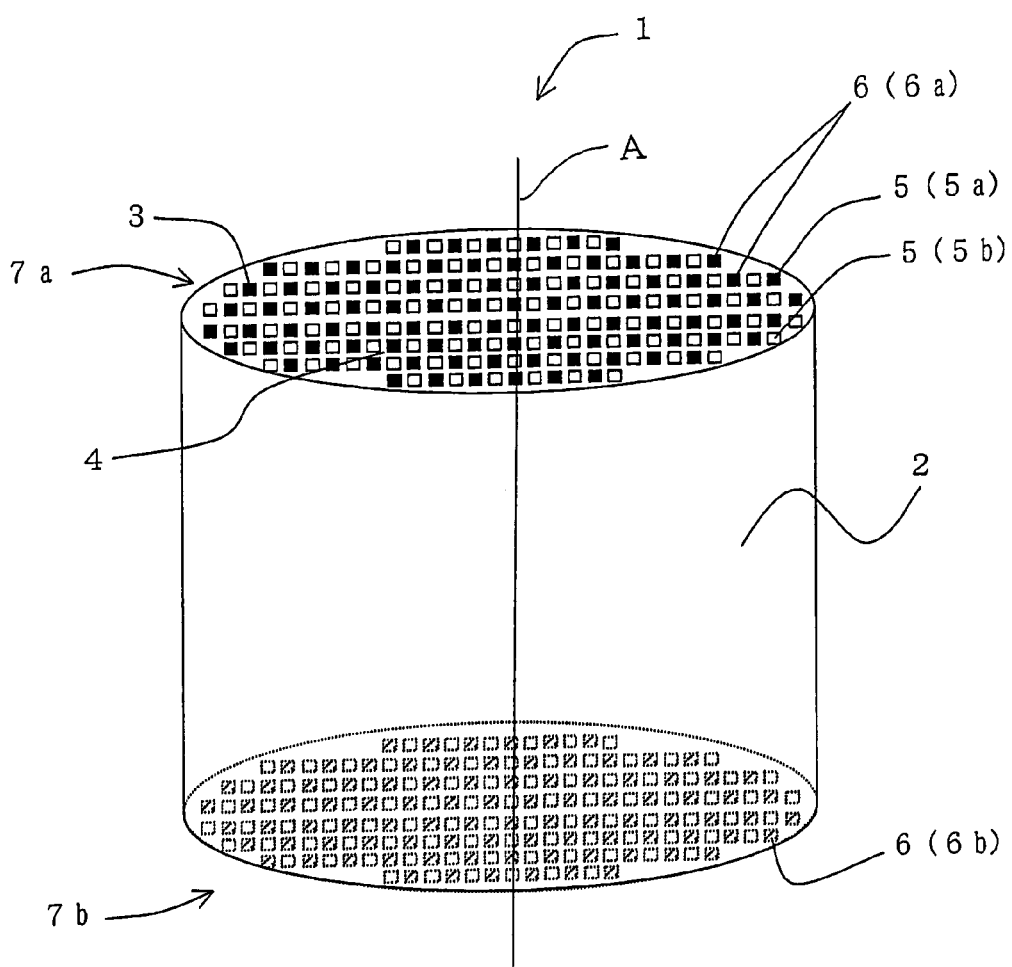
FIG. 1 is a perspective view showing a plugged honeycomb structure manufactured by one embodiment of a method for manufacturing a plugged honeycomb structure of the present invention (first aspect of the invention).
Figure 2:
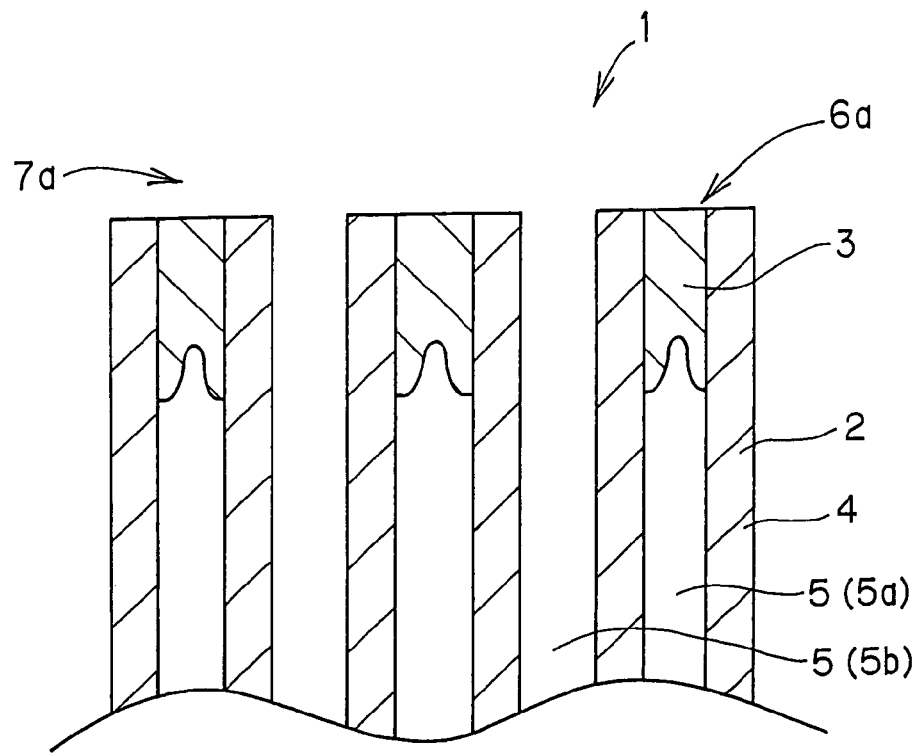
FIG. 2 is a sectional view showing an example of a section obtained by cutting a plugged honeycomb structure shown in FIG. 1 at the plane A including the central axis.
Figure 3:
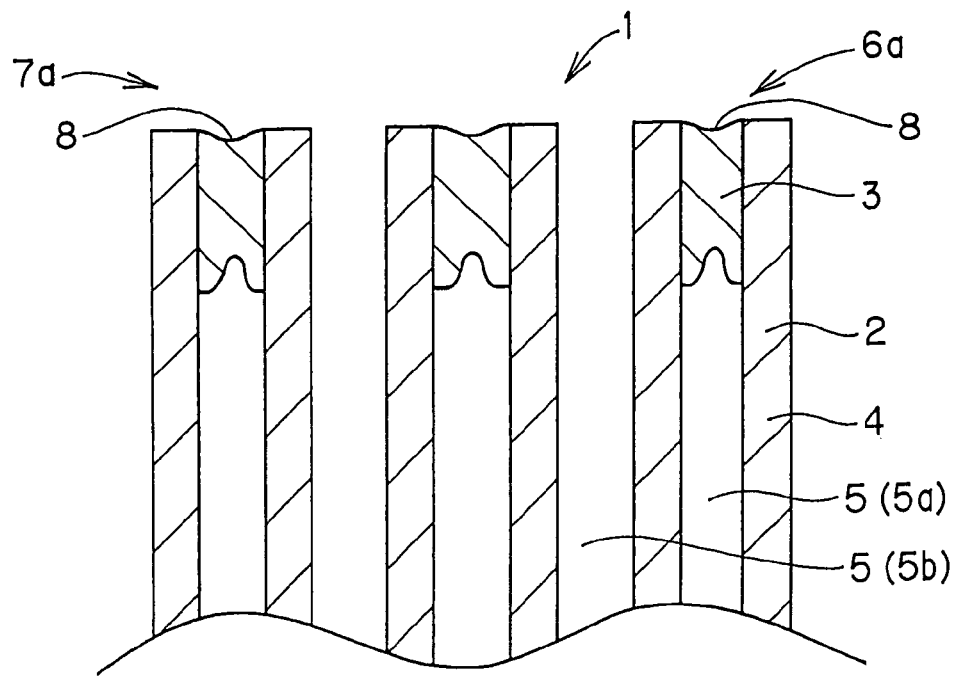
FIG. 3 is a sectional view showing another example of a section obtained by cutting a plugged honeycomb structure shown in FIG. 1 at the plane A including the central axis.

First, description is made on an embodiment of a method for manufacturing a plugged honeycomb structure of the present invention (first aspect of the invention). FIG. 1 is a perspective view schematically showing a plugged honeycomb structure manufactured by an embodiment of a method for manufacturing a plugged honeycomb structure of the present invention (first aspect of the invention). FIG. 2 is a sectional view showing an example of a section obtained by cutting a plugged honeycomb structure shown in FIG. 1 at the plane A including the central axis, and FIG. 3 is a sectional view showing another example of a section obtained by cutting a plugged honeycomb structure shown in FIG. 1 at the plane A including the central axis. A method for manufacturing a plugged honeycomb structure of the present embodiment is a method for manufacturing a plugged honeycomb structure 1 as shown in FIG. 1 having a cylindrical honeycomb structure 2 having porous partition walls 4 separating and forming a plurality of cells 5 functioning as fluid passages and a sealing member 3 for sealing an opening 6a of each of predetermined cells 5a and the other opening 6b of each of the remaining cells 5b. A method for manufacturing a plugged honeycomb structure of the present embodiment can suitably manufacture a plugged honeycomb structure 1 in which the plugging member 3 has a flat end face on at least one end face of the honeycomb structure 2 as shown in FIG. 2 or, even if a depression 8 toward inside the honeycomb structure 2 from one end face 7a is formed on an end face of the plugging member 3, the depth of the depression 8 is 1 mm or less as shown in FIG. 3 so as to reduce accumulation of deposit on an end face particularly in the case that the obtained plugged honeycomb structure is used as a filter or the like.

Figure 4:
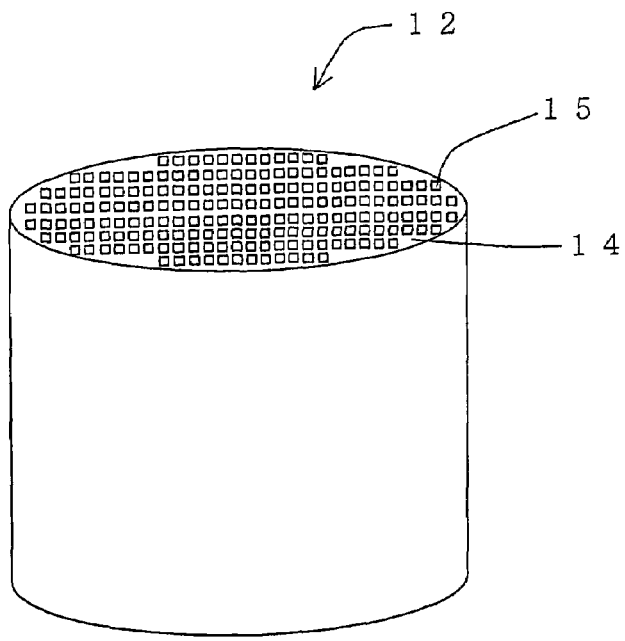
FIG. 4 is a perspective view showing an unfired honeycomb structure in an embodiment of a method for manufacturing a plugged honeycomb structure of the present invention (first aspect of the invention).
Figure 5:
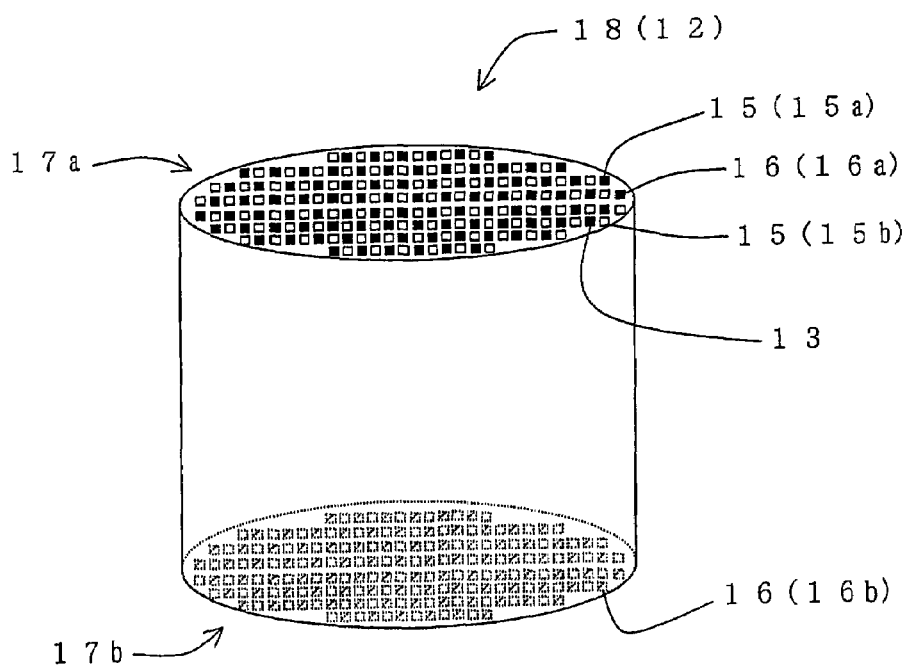
FIG. 5 is a perspective view showing a plugged honeycomb structure precursor in an embodiment of a method for manufacturing a plugged honeycomb structure of the present invention (first aspect of the invention).
Figure 6:
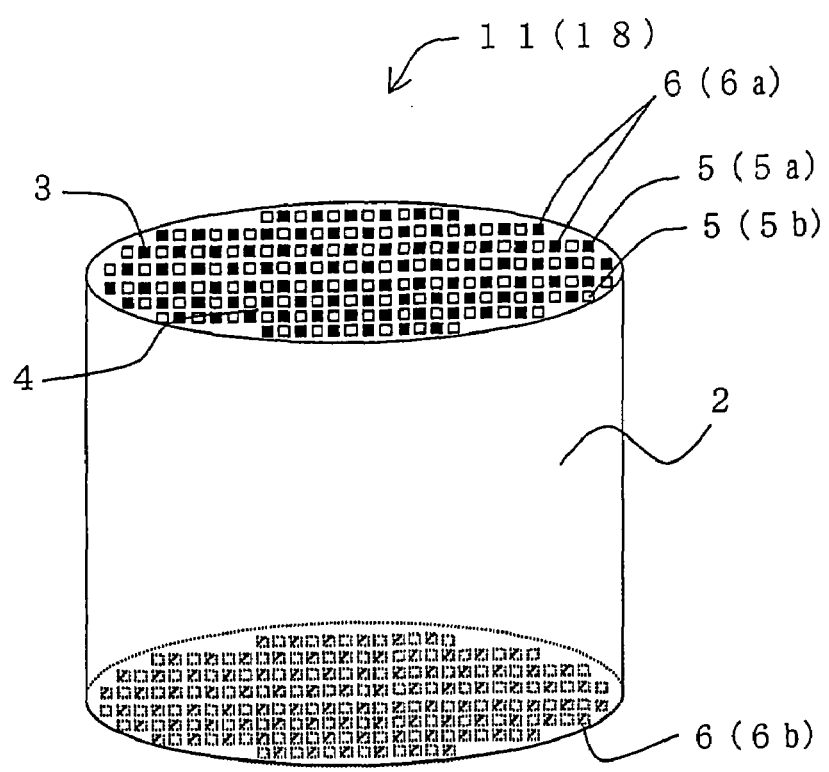
FIG. 6 is a perspective view showing a plugged honeycomb structure in an embodiment of a method for manufacturing a plugged honeycomb structure of the present invention (first aspect of the invention).
Figure 7:
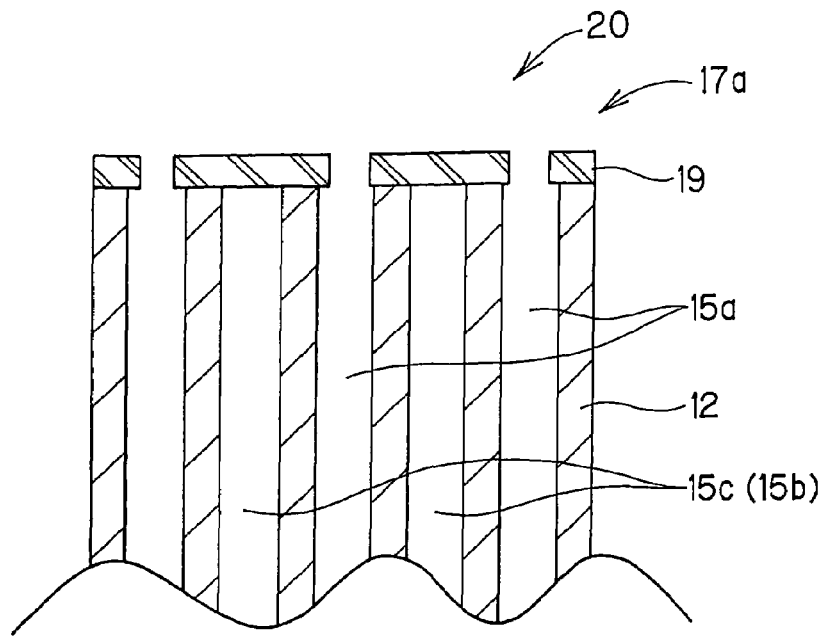
FIG. 7 is a sectional view showing a masked honeycomb structure in an embodiment of a method for manufacturing a plugged honeycomb structure of the present invention (first aspect of the invention) and section similar to that in FIG. 2.
Figure 8:
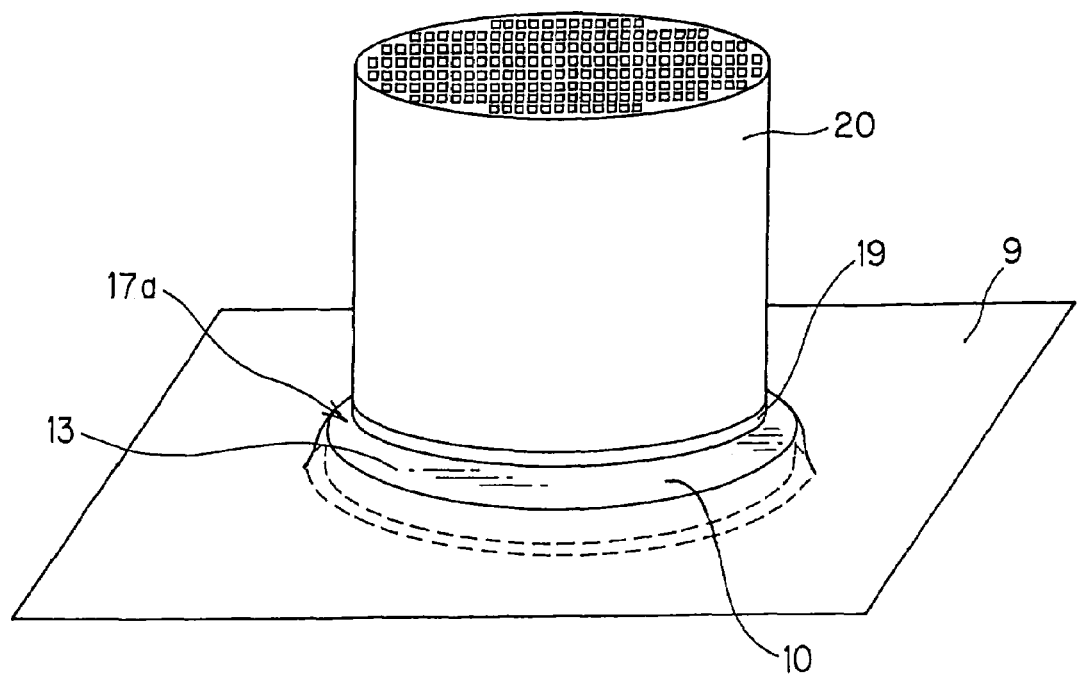
FIG. 8 is a perspective view schematically showing a step of filling plugging slurry in an embodiment of a method for manufacturing a plugged honeycomb structure of the present invention (first aspect of the invention).
Figure 9:
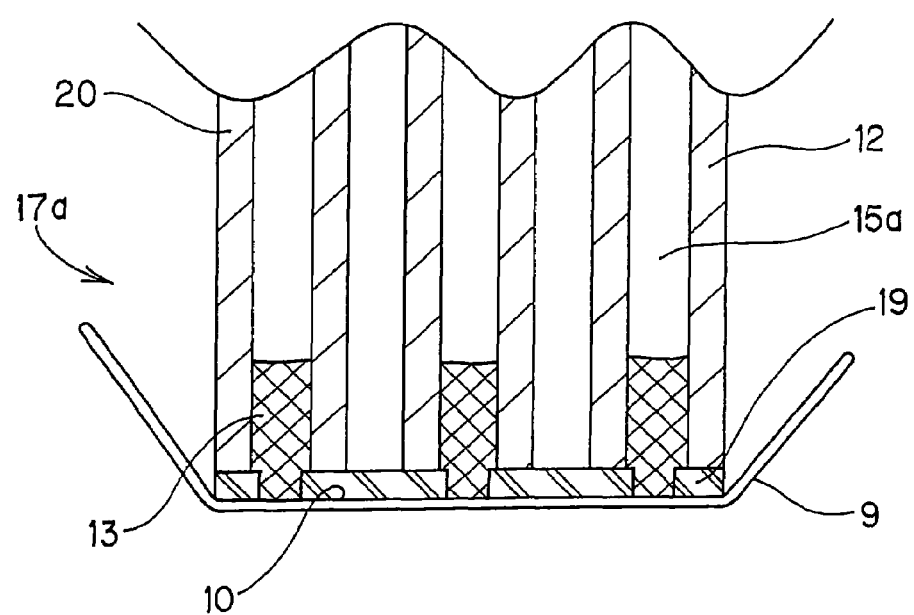
FIG. 9 is a sectional view schematically showing a section obtained by cutting, at a plane including the central axis, a masked honeycomb structure where plugged slurry is filled by an end face sealing member in an embodiment of a method for manufacturing a plugged honeycomb structure of the present invention (first aspect of the invention).
Figure 10:
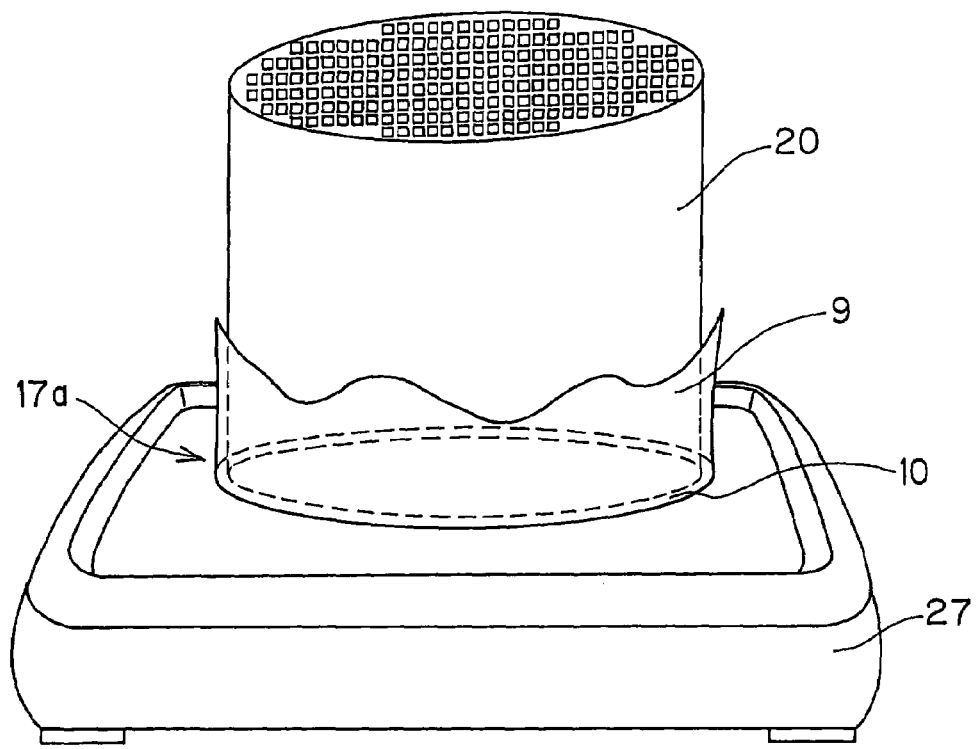
FIG. 10 is a perspective view schematically showing a step of drying plugging slurry in an embodiment of a method for manufacturing a plugged honeycomb structure of the present invention (first aspect of the invention).

In a method for manufacturing a plugged honeycomb structure of the present embodiment, a ceramic forming raw material is subjected to extrusion forming to obtain a cylindrical unfired honeycomb structure 12 having porous partition walls 14 separating and forming a plurality of cells 15 functioning as fluid passage as shown in FIG. 4, plugging slurry 13 containing ceramic is filled in an opening 16a of predetermined cells 15a and the other opening 16b of the remaining cells 15b of the obtained unfired honeycomb structure 12 or a fired honeycomb structure (not illustrated) obtained by firing the unfired honeycomb structure 12 to obtain a plugged honeycomb structure precursor 18 as shown in FIG. 5, and the obtained plugged honeycomb structure precursor 18 is fired to obtain a plugged honeycomb structure 11 as shown in FIG. 6. At least when plugging slurry 13 is filled in the opening 16a of the predetermined cells 15a of the unfired honeycomb structure 12 or the fired honeycomb structure (not illustrated) as shown in FIG. 5, a mask 19 covering the opening of each of cells 15c (i.e. the remaining cells 15b) other than the predetermined cells 15a is disposed on one end face 17a of the unfired honeycomb structure 12 or the fired honeycomb structure (not illustrated) to obtain a masked honeycomb structure 20 as shown in FIG. 7, a predetermined amount of the plugging slurry 13 is applied on a face 10 of an end face sealing member 9 having a predetermined face 10 size and limiting motion of the plugging slurry 13 inside the predetermined cells 15a by bringing the face 10 into contact with the one end face 17a of the masked honeycomb structure 20 when the plugging slurry 13 is filled in the opening of each of the predetermined cells 15a as shown in FIGS. 8 and 9, the one end face 17a of the masked honeycomb structure 20 is pressed against the face 10 to which the plugging slurry 13 was applied of the end face sealing member 9 to fill the plugging slurry 13 in the predetermined cells 15a on the one end face 17a side, and at least the plugging slurry 13 at a portion in contact with the face 10 of the end face sealing member 9 is dried in a state that the face 10 of the end face sealing member 9 is pressed against the one end face 17a of the masked honeycomb structure 20 (see FIG. 9) as shown in FIG. 10 to obtain a plugged honeycomb structure precursor 18 (see FIG. 6). Incidentally, in a plugged honeycomb structure 11 shown in FIG. 6, with regard to the same elements as those in the plugged honeycomb structure 1 shown in FIG. 1, the same reference numerals are given with description being omitted. Here, FIG. 4 is a perspective view showing an unfired honeycomb structure in a method for manufacturing a plugged honeycomb structure of the present embodiment, FIG. 5 is a perspective view showing a plugged honeycomb structure precursor in a method for manufacturing a plugged honeycomb structure of the present embodiment, FIG. 6 is a perspective view showing a plugged honeycomb structure in a method for manufacturing a plugged honeycomb structure of the present embodiment, and FIG. 7 is a sectional view showing a masked honeycomb structure in a method for manufacturing a plugged honeycomb structure of the present embodiment. Incidentally, FIG. 7 shows a section similar to that in FIG. 2. FIG. 8 is a perspective view schematically showing a step of filling plugging slurry in a method for manufacturing a plugged honeycomb structure of the present embodiment, FIG. 9 is a sectional view schematically showing a section obtained by cutting, at a plane including the central axis, a masked honeycomb structure where plugged slurry is filled by an end face sealing member in a method for manufacturing a plugged honeycomb structure of the present embodiment, and FIG. 10 is a perspective view schematically showing a step of drying plugging slurry in a method for manufacturing a plugged honeycomb structure of the present embodiment.

By this constitution, it is possible that a depression depressed toward inside the honeycomb structure from one end face 17a is not formed on one end face 17a side where a face 10 of the end face sealing member 9 is pressed or, even if a depression toward inside the honeycomb structure from one end face is formed on an end face of the plugging member, the depth of the depression is 1 mm or less (i.e., 0 to 1 mm) when the plugging slurry 13 is reduced in volume upon drying, which is difficult by conventional methods, and thereby a plugged honeycomb structure 1 with reduced accumulation of deposit on an end face can be manufactured simply and at a low cost.

Figure 18:
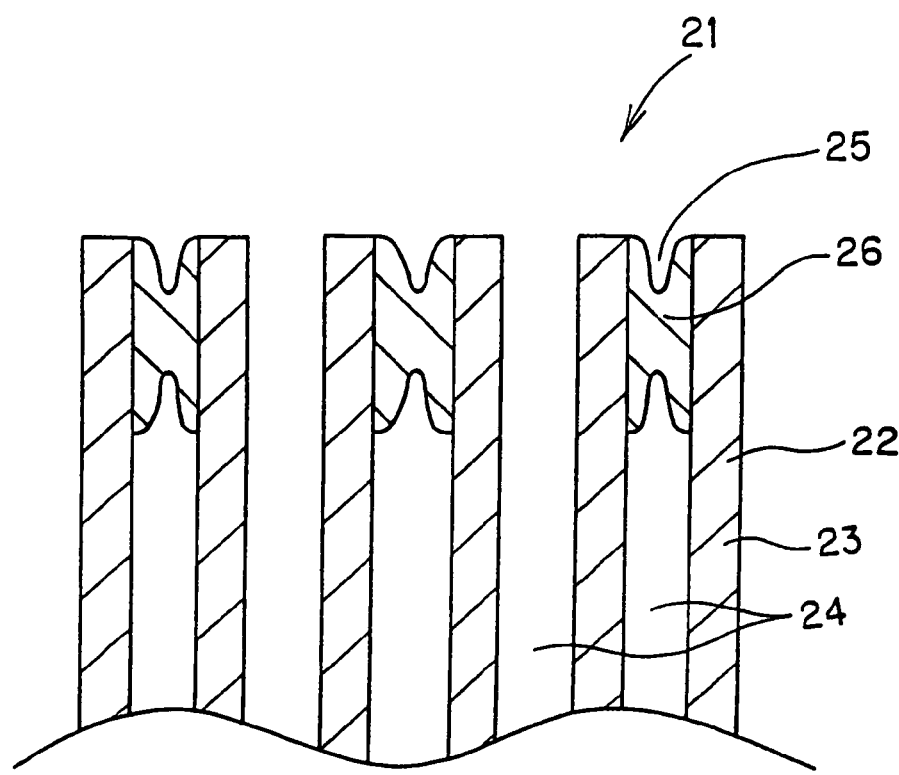
FIG. 18 is a sectional view showing a conventional plugged honeycomb structure on one end portion side.

In a plugged honeycomb structure manufactured in a conventional method for manufacturing a plugged honeycomb structure, above 1 mm of a depression 25 called "shrink dent" from production problem is formed toward inside the honeycomb structure 22 from an end face thereof on an end face of a plugging member 26 as shown in FIG. 18. When such a plugged honeycomb structure 21 is used as a filter such as a DPF, deposit (particulate matter) such as soot accumulates on the depression 25, and the deposit serves as a core, and deposit easily accumulates on an end face of the plugged honeycomb structure 21. By such accumulation of deposit on an end face of the plugged honeycomb structure 21, openings of the cells 23 without sealing with a plugging member 26 are clogged, which causes a problem of rise in a pressure loss. In a method for manufacturing a plugged honeycomb structure of the present embodiment, since one end face 17a of the masked honeycomb structure 20 is pressed against the face 10 to which the plugging slurry 13 was applied of the end face sealing member 9 to fill the plugging slurry 13 in the predetermined cells 15a on the one end face 17a side, and drying at least the plugging slurry 13 at a portion in contact with the face 10 of the end face sealing member 9 in a state that the face 10 of the end face sealing member 9 is pressed against the one end face 17a of the masked honeycomb structure 20 as shown in FIGS. 8 to 10, it is possible that a depression depressed toward inside the honeycomb structure from one end face 17a is not formed on one end face 17a side where a face 10 of the end face sealing member 9 is pressed or, even if a depression toward inside the honeycomb structure from one end face is formed on an end face of the plugging member, the depth of the depression is 1 mm or less (i.e., 0 to 1 mm).

In addition, though it is necessary to flatten an end face by filling plugging slurry in the depression formed on an end face of the plugging member again or to cut a predetermined length from an end face of the plugged honeycomb structure for use in a plugged honeycomb structure manufactured in a conventional method for manufacturing a plugged honeycomb structure, a method for manufacturing a plugged honeycomb structure of the present embodiment can give a plugged honeycomb structure having a flat end face of a plugging member on at least one end face side of the obtained plugged honeycomb structure or a honeycomb structure with a depression having a depth of 1 mm or less (i.e., 0 to 1 mm) even if a depression toward inside the honeycomb structure from one end face is formed on an end face of the plugging member by filling the plugging slurry only once.

A method for manufacturing a plugged honeycomb structure of the present embodiment is hereinbelow described more specifically by every step.

First, a forming raw material containing ceramic is subjected to extrusion forming as shown in FIG. 4 to obtain a cylindrical unfired honeycomb structure 12 having porous partition walls 14 separating and forming a plurality of cells 15 functioning as fluid passages. There may suitably be used as the forming raw material containing ceramic a material prepared by adding a binder, a dispersion medium, etc., to a ceramic powder of cordierite, mullite, alumina, spinel, silicon carbide, silicon nitride, lithium aluminum silicate, aluminum titanate, or the like, and kneaded the mixture. There is no particular limitation on a method of extrusion forming, and a conventionally known method such as extrusion forming using, for example, a vacuum extrusion forming machine.

Next, as shown in FIG. 7, a mask 19 is disposed so as to cover an openings of each of the cells 15c other than the predetermined cell 15a on one end face 17a of an unfired honeycomb structure 12 or a fired honeycomb structure (not illustrated) obtained by firing the unfired honeycomb structure 12 to obtain a masked honeycomb structure 20. Incidentally, though FIG. 7 shows the masked honeycomb structure 20 where the mask 19 is disposed on the unfired honeycomb structure 12, the masked honeycomb structure 20 may be prepared by disposing the mask 19 on a fired honeycomb structure (not illustrated) obtained by firing the unfired honeycomb structure 12 as described above.

Here, the mask 19 disposed on one end face 17a of the unfired honeycomb structure 12 or the fired honeycomb structure (not illustrated) is used for introducing plugging slurry 13 only in the predetermined cells 15a by covering the openings of the cells 15c other than the predetermined cells 15a, and a mask used upon manufacturing a conventional honeycomb structure can suitably be used as the mask 19. Specifically, there may be employed as the mask 19 one formed by bonding an adhesive sheet on one end face 17a of the unfired honeycomb structure 12 or the fired honeycomb structure (not illustrated) and making holes at predetermined portions corresponding to the predetermined cells 15a by image processing.

Next, as shown in FIGS. 8 and 9, a predetermined amount of the plugging slurry 13 is applied on a face 10 of an end face sealing member 9 having a predetermined face 10 size and limiting motion of the plugging slurry 13 inside the predetermined cells 15a by bringing the face 10 into contact with the one end face 17a of the masked honeycomb structure 20 when the plugging slurry 13 is filled in the opening of each of the predetermined cells 15a.

Then, the one end face 17a of the masked honeycomb structure 20 is pressed against the face 10 to which the plugging slurry 13 was applied of the end face sealing member 9 to fill the plugging slurry 13 in the predetermined cells 15a on the one end face 17a side.

The above end face sealing member 9 is for limiting motion of the plugging slurry 13 inside the predetermined cells 15a by sealing up the one end face 17a of the unfired honeycomb structure 12 or the fired honeycomb structure (not illustrated) upon drying as well as it functions as a container for the plugging slurry 13 applied on the face 10 and filled in the predetermined cells 15a. There may be used as the end face sealing material 9 one prepared by forming a dent corresponding to a shape of the one end face 17a of the unfired honeycomb structure 12 or the fired honeycomb structure (not illustrated) on a sheet-shaped member having flexibility. Specifically, aluminum foil or a resin film may suitably be used. There is no limitation on the end face sealing member 9 as long as a predetermined amount of plugging slurry can be placed thereon and the plugging slurry 13 can be filled in the predetermined cells 15a. For example, it may be a bottomed cylindrical container having a face (bottom) corresponding to a shape of the one end face 17a of the unfired honeycomb structure 12 or the fired honeycomb structure (not illustrated).

As such an end face sealing member 9, there may be employed a bottomed cylindrical one constituted by sticking a sheet-shaped end face sealing member 9 fast to the inside of a cylindrical tub 31 as shown in FIGS. 11 to 14. FIGS. 11 to 14 are explanatory views showing steps of forming a bottomed cylindrical container.

Figure 11:
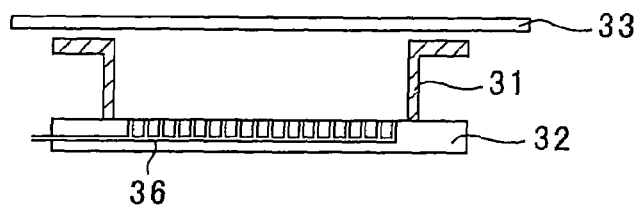
FIG. 11 is an explanatory view showing a step of forming a bottomed cylindrical container by the use of a sheet-shaped end face sealing material.

Specifically, a cylindrical tub 31 is first disposed on a pedestal 32 having a suction port capable of vacuum drawing on the surface thereof as shown in FIG. 11. Further, a sheet-shaped end face sealing member 33 having flexibility is disposed at an opening portion over the tub 31. Incidentally, since a bottomed cylindrical container is formed with sticking the sheet-shaped end face sealing member 33 fast to the inside of the cylindrical tub 31 as described above, it is necessary to employ a tub 31 having a diameter larger than the outer diameter of the honeycomb structure (e.g., masked honeycomb structure 20 (see FIG. 7)) to be plugged. In addition, since the inside of the tub 31 is subjected to vacuum drawing in the following step, the tub 31 is disposed on the pedestal 32 in an airtight condition.

Figure 12:
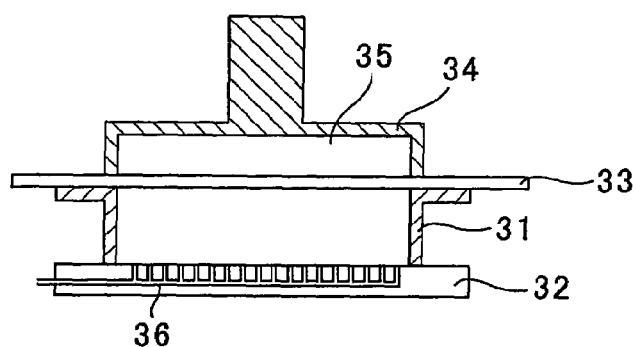
FIG. 12 is an explanatory view showing a step of forming a bottomed cylindrical container by the use of a sheet-shaped end face sealing material.

Next, as shown in FIG. 12, a lid 34 is disposed on a sheet-shaped end face sealing member 33 disposed at the opening portion over the tub 31. This lid 34 is for holding the sheet-shaped end face sealing member 33 at the opening portion of the tub 31. Incidentally, the lid 34 is disposed so that a difference in pressure is caused between both sides of the end face sealing member 33 upon vacuum drawing inside the tub 31. For example, as shown in FIG. 12, the lid 34 may have a shape which forms a space 35 with the end face sealing member 33, or a hole may be formed in a portion of the lid 34 to cause a difference in pressure between inside and outside of the tub though the illustration is omitted.

Figure 13:
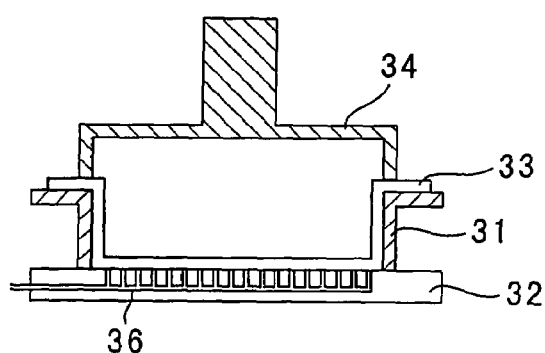
FIG. 13 is an explanatory view showing a step of forming a bottomed cylindrical container by the use of a sheet-shaped end face sealing material.

Then, as shown in FIG. 13, the inside of the tub 31 is vacuum-drawn from the suction port 36 provided on the pedestal 32 to stick the end face sealing member 33 fast to the inside of the tub 31 by the vacuum force.

Figure 14:
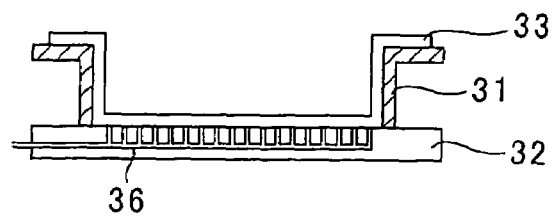
FIG. 14 is an explanatory view showing a step of forming a bottomed cylindrical container by the use of a sheet-shaped end face sealing material.

Next, the lid 34 is removed to obtain an end face sealing member 33 formed in a shape of the inner surface of the tub 31 as shown in FIG. 14. Since such an end face sealing member 33 is formed in a bottomed cylindrical shape, a predetermined amount of plugging slurry 13 (see FIG. 9) can be applied inside thereof in good conditions.

It is preferable that an end face sealing member 9 as shown in FIG. 10 is constituted by, for example, copper, aluminum, or iron to have high thermal conductivity so that heat can easily be conducted upon drying the plugging slurry 13. In addition, the end face sealing member 9 may be thinned in order to enhance thermal conductivity.

It is also preferable that the end face sealing member 9 has at least one characteristic selected from a group consisting of high airtightness, excellent water resistance, thermal resistance capable of standing heat upon drying, and low thermal expansion-shrinkage so that drying of the plugging slurry 13 can be performed in good conditions.

Incidentally, a predetermined amount of plugging slurry 13 applied on the face 10 of the end face sealing member 9 is plugging slurry 13 having a larger amount than an amount required for being filled in the predetermined cells 15*a*. The size of the face 10 of the end face sealing member 9 is not particularly limited, and it may be larger or smaller than the one end face 17*a* of the masked honeycomb structure 20.

There is no particular limitation on plugging slurry 13 used in a method for manufacturing a plugged honeycomb structure of the present embodiment, and there may suitably be used slurry prepared by adding a binder, a dispersion medium, etc., to a ceramic powder, for example, a cordierite powder and kneading the mixture. There is no limitation on kind of the ceramic powder, and the same one as the ceramic powder contained in a forming raw material used when the above unfired honeycomb structure 12 subjected to extrusion forming, or a different ceramic powder may be used.

In a method for manufacturing a plugged honeycomb structure of the present embodiment, it is preferable that the plugged slurry 13 contains a pore former. By thus making the plugged slurry 13 contain a pore former, a shrink dent (defect of forming a depression on an end face of the plugging member) can be inhibited from generating upon drying the plugging slurry 13. There is no particular limitation on kind of the pore former, and examples of the pore former include foaming resin, graphite, flour, starch, phenol resin, polymethyl methacrylate, polyethylene, poly(ethylene telephthalate, shirasu balloon, and fly-ash balloon.

A cause of forming a depression on an end face of the plugging member of a plugged honeycomb structure obtained by the conventional manufacture method is reduction in volume of plugging slurry due to sharp absorption of water contained in the plugging slurry by the honeycomb structure or evaporation of water in the steps of drying and firing. As described above, by adding a pore former to plugging slurry, it is possible to inhibit water from being absorbed by the honeycomb structure and to suppress decrease in volume of the plugging slurry, and thereby an end face of the plugging member can be made more flat. In addition, because the plugging member is porous, a plugged honeycomb structure having a reduced pressure loss can be manufactured.

In a method for manufacturing a plugged honeycomb structure of the present embodiment, it is preferable that the plugging slurry 13 has a viscosity of 100 to 1500 dPa·s. This enables to suppress generation of shrink dents upon drying the plugging slurry 13 and to enhance mechanical strength of the plugging member 3 obtained (see FIG. 1). Incidentally, when the viscosity of the plugging slurry 13 is below 100 dPa·s, shrink dents are prone to generate, which is not preferable. When the viscosity of the plugging slurry 13 is above 1500 dPa·s, it is difficult to fill the plugging slurry 13 in the predetermined cells 15*a*, which is not preferable.

Next, as shown in FIGS. 9 and 10, at least the plugging slurry 13 at a portion in contact with the face 10 of the end face sealing member 9 is dried in a state that the face 10 of the end face sealing member 9 is pressed against the one end face 17*a* of the masked honeycomb structure 20. Incidentally, "at least the plugging slurry 13 at a portion in contact with the face 10 of the end face sealing member 9 is dried" means that at least a part of the solvent contained in the plugging slurry 13 at the portion in contact with the face 10 of the end face sealing member 9 is vaporized to reduce flowability of the plugging slurry 13 at the portion in contact with the face 10 of the end face sealing member 9. By this drying the plugging slurry is hardened to the extent that the plugging slurry 13 at the portion in contact with the face 10 of the end face sealing member 9 is not deformed in the following drying and firing steps.

In the conventional manufacture method, a masked honeycomb structure having a mask disposed on one end face of an unfired honeycomb structure or a fired honeycomb structure is pressed against a container containing a large amount of plugging slurry to fill the plugging slurry in an opening of each of the predetermined cells of the masked honeycomb structure, and then the masked honeycomb structure is taken out from the container in the state that the plugging slurry is filled in the opening of each of the predetermined cells. Therefore, stress from outside and/or inside, such as surface tension or force among molecules acts upon an end face of the plugging slurry filled in the opening of each of the predetermined cells to cause shrink dents. In a method for manufacturing a plugged honeycomb structure of the present embodiment, since drying is performed in a state that the face 10 of the end face sealing member 9 is pressed against the one end face 17*a* side, vacuum force is generated on an end face of the plugging slurry 13, and thereby the aforementioned stress from outside and/or inside can be reduced. Therefore, the shrink dents of the filled plugging slurry 13 can effectively be inhibited on a face in contact with the face 10 of the end face sealing member 9.

In addition, in a conventional manufacture method, since plugging slurry is filled in the state that the container contains a large amount of plugging slurry as described above, plugging slurry remains in the container after the filling is completed, which requires to spend time on washing the container. In a method for manufacturing a plugged honeycomb structure of the present embodiment, since it is possible to fill the plugging slurry 13 by applying a necessary and sufficient amount of the plugging slurry 13 on the surface 10 of the end face sealing member 9, an amount of the remaining plugging slurry 13 can be reduced, or the plugging slurry 13 applied on the surface 10 can completely be consumed, which enables to save time of washing the container or the like.

There is no particular limitation on a method for drying the plugging slurry 13, and example of the method include a method of drying with the masked honeycomb structure 20 having an end face sealing member 9 being placed on a hot plate 27 or the like in the state that an end face 17a faces downward and a hot-air drying method where hot air is made to blow against the plugging slurry 13. When a wrap film or the like is used as the end face sealing member 9, microwave drying may be employed. When aluminum foil, copper foil or the like is used as the end face sealing member 9, the plugging slurry 13 may be dried by the heat generated from the end face sealing member 9 by electrifying the end face sealing member 9.

Next, though the illustration is omitted, plugging slurry is filled in the other opening of each of the remaining cells on the other end face of the unfired honeycomb structure or the fired honeycomb structure, and the slurry is dried to manufacture a plugged honeycomb structure precursor 18 (see FIG. 5). In a method for manufacturing a plugged honeycomb structure of the present embodiment, there is no particular limitation on a method of filling the plugging slurry in the other opening of each of the remaining cells and a method of drying the plugging slurry. The plugging slurry may be filled and dried in the same manner as in the predetermined cells 15a shown in FIGS. 7 to 9 or in a conventionally known method.

Then, as shown in FIG. 6, the plugged honeycomb structure precursor 18 obtained is fired to obtain a plugged honeycomb structure 11. There is no particular limitation on a method for firing the plugged honeycomb structure precursor 18, and it may be fired in accordance with a firing step in a conventionally known method for manufacturing a plugged honeycomb structure. According to such a method for manufacturing a plugged honeycomb structure, a plugged honeycomb structure with reduced accumulation of deposit on an end face thereof when it is used as a filter or the like as shown in FIG. 1 can be manufactured simply and at a low cost.

In a method for manufacturing a plugged honeycomb structure of the present embodiment, as shown in FIGS. 9 and 10, the end face sealing member 9 may be removed from the plugged honeycomb structure precursor 18 (see FIG. 6) after the plugging slurry 13 at the portion in contact with the face 10 of the end face sealing member 9 is dried. By the above drying, the plugging slurry 13 at the portion in contact with the face 10 of the end face sealing member 9 is not deformed in the following drying and firing steps. Therefore, even if the end face sealing member 9 is removed at this stage, shrink dents or the like are not caused. Incidentally, the mask 19 disposed on one end face of the unfired honeycomb structure or the fired honeycomb structure may be removed at the same time (see FIG. 7).

In addition, in a method for manufacturing a plugged honeycomb structure of the present embodiment, an end face sealing member 9 constituted by a flammable substance may be used as the end face sealing member 9 as shown FIGS. 8 to 10 to burn up the end face sealing member 9 when the plugged honeycomb structure precursor 18 (see FIG. 6) is fired. Since this constitution makes removal of the end face sealing member 9 unnecessary, the manufacture process can be simplified. Particularly, in the case that the end face sealing member 9 is burnt up by firing, the end face sealing member 9 is preferably constituted by a flammable substance which is burnt up at the stage of firing, and a suitable example is an end face sealing member 9 constituted by poly(vinyl chloride) or the like.

In addition, in a method for manufacturing a plugged honeycomb structure of the present embodiment, the mask 19 (see FIG. 7) covering an opening of each of the cells other than the predetermined cells may be burnt up together with the end face sealing member 9 at the time of firing the plugged honeycomb structure precursor 18 (see FIG. 6). By thus burning the end face sealing member 9 and the mask 19 (see FIG. 7) at the same time, the step of removing the mask 19 (see FIG. 7) can be omitted, and thereby the manufacture process can further be simplified.

Incidentally, in a method for manufacturing a plugged honeycomb structure of the present embodiment, a catalyst may be loaded on the internal surface and/or the inside of the partition walls 4 of the plugged honeycomb structure 1 obtained in the above method and as shown in FIG. 1. For example, when the plugged honeycomb structure is used as a DPF, it is preferable to load a catalyst having a function of accelerating combustion of deposit (particulate matter) trapped in the partition walls. Suitable examples of such a catalyst include noble metals such as Pt, Pd, and Rh and a nonmetal such as a perovskite type catalyst. The catalyst may be loaded in accordance with a conventional method for loading a catalyst on a filter such as a DPF.

Next, description will be made on an embodiment of a method for manufacturing a plugged honeycomb structure of the present invention (second aspect of the invention). A method for manufacturing a plugged honeycomb structure of the present embodiment is a method for manufacturing a plugged honeycomb structure 1 provided with a cylindrical honeycomb structure 2 having porous partition walls 4 separating and forming a plurality of cells 5 functioning as fluid passages and a sealing member 3 for sealing an opening 6a of each of predetermined cells 5a and the other opening 6b of each of the remaining cells 5b. A method for manufacturing a plugged honeycomb structure of the present embodiment can suitably manufacture a plugged honeycomb structure 1 in which the plugging member 3 has a flat end face on at least one end face of the honeycomb structure 2 as shown in FIG. 2 or, even if a depression 8 toward inside the honeycomb structure 2 from one end face 7a is formed on an end face of the plugging member 3, the depth of the depression 8 is 1 mm or less as shown in FIG. 3 so as to reduce accumulation of deposit on an end face particularly in the case that the obtained plugged honeycomb structure is used as a filter or the like.

Figure 15:
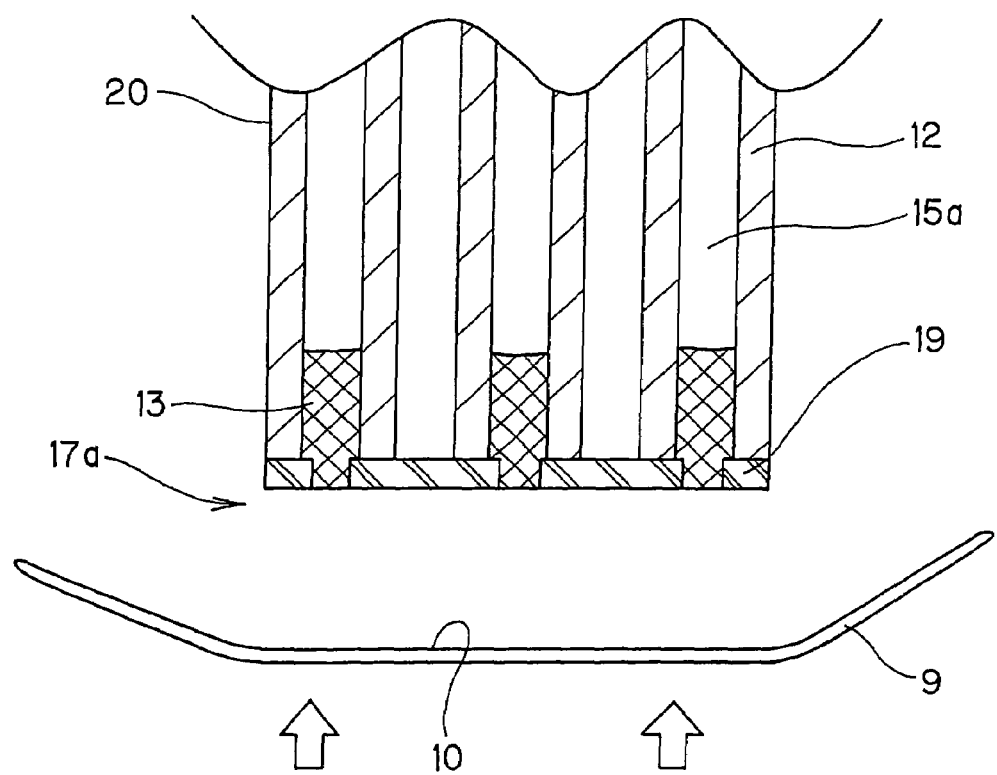
FIG. 15 is a sectional view schematically showing a step of pressing an end face sealing member against a masked honeycomb structure where plugging slurry is filled in an embodiment of a method for manufacturing a plugged honeycomb structure of the present invention (second aspect of the invention) and section similar to that in FIG. 9.

A method for manufacturing a plugged honeycomb structure of the present embodiment will hereinbelow be described by every step. In a method for manufacturing a plugged honeycomb structure of the present embodiment, a ceramic forming raw material is subjected to extrusion forming as shown in FIG. 4 to obtain a cylindrical unfired honeycomb structure 12 having porous partition walls 14 separating and forming a plurality of cells 15 functioning as fluid passages, plugging slurry 13 containing ceramic is filled in one opening 15a of each of predetermined cells of the unfired honeycomb structure 12 or a fired honeycomb structure (not illustrated) obtained by firing the unfired honeycomb structure 12 and in the other opening 16b of each of the remaining cells 15b as shown in FIG. 5 to obtain a plugged honeycomb structure precursor 18, and the plugged honeycomb structure precursor 18 obtained is fired as shown in FIG. 6 to obtain a plugged honeycomb structure 11. A shown in FIG. 7, a mask 19 covering the opening of each of cells 15c other than the predetermined cells 15a is disposed on one end face 17a of the unfired honeycomb structure 12 or the fired honeycomb structure (not illustrated) at least when the plugging slurry 13 is filled in one opening 16a of each of the predetermined cells 15a of the unfired honeycomb structure 12 or the fired honeycomb structure (not illustrated) as shown in FIG. 5 to obtain a masked honeycomb structure 20, and after the plugging slurry 13 is filled in the predetermined cells 15a on the one end face 17a side in the masked honeycomb structure 20, at least the plugging slurry 13 at a portion in contact with the face 10 of the end face sealing member 9 is dried in a state that the face 10 of the end face sealing member 9 having a predetermined face 10 size and limiting motion of the plugging slurry 13 inside the predetermined cells 15a by bringing the face 10 into contact with the one end face 17a of the masked honeycomb structure 20 is pressed against the one end face 17a of the masked honeycomb structure 20 as shown in FIG. 15 to obtain the plugged honeycomb structure precursor 18 (see FIG. 6). Here, FIG. 15 is a sectional view schematically showing a step of pressing an end face sealing member against a masked honeycomb structure where plugging slurry is filled in a method for manufacturing a plugged honeycomb structure of the present embodiment.

Incidentally, in a method for manufacturing a plugged honeycomb structure, the steps until a masked honeycomb structure 20 is obtained as shown in FIGS. 4 to 7 can be conducted in a manner similar to that of a method for manufacturing a plugged honeycomb structure of one embodiment of the first aspect of the invention.

In a method for manufacturing a plugged honeycomb structure of the present embodiment, after a masked honeycomb structure 20 as shown in FIG. 7 is obtained, the plugging slurry 13 (see FIG. 15) is filled in the predetermined cells 15a (see FIG. 15) in a conventionally known method. Then, at least the plugging slurry 13 at a portion in contact with the face 10 of the end face sealing member 9 is dried in a state that the face 10 of the end face sealing member 9 limiting motion of the plugging slurry 13 inside the predetermined cells 15a is pressed against the one end face 17a of the masked honeycomb structure 20 as shown in FIG. 15 to obtain the plugged honeycomb structure precursor 18 (see FIG. 6). There may suitably be used, as this end face sealing member 9, one constituted in the same manner as in the end face sealing member 9 used in a method for manufacturing a plugged honeycomb structure of one embodiment of the first aspect of the invention.

In a method for manufacturing a plugged honeycomb structure of the present embodiment, the plugging slurry 13 is filled in a conventionally known method, and then motion of the plugging slurry 13 inside the predetermined cells 15a is limited by the end face sealing member 9 to inhibit shrink dents or the like from generating. Therefore, the drying and firing steps after the face 10 of the end face sealing member 9 is pressed against the one end face 17a of the masked honeycomb structure 20 may be performed in the same manner as in a method for manufacturing a plugged honeycomb structure of one embodiment of the first aspect of the invention.

By this constitution, effects can be obtained in the same manner as in a method for manufacturing a plugged honeycomb structure of one embodiment of the first aspect of the invention.

In addition, in a method for manufacturing a plugged honeycomb structure of the present embodiment, the end face sealing member 9 may be removed from the plugged honeycomb structure precursor 18 (see FIG. 6) after the plugging slurry 13 at the portion in contact with the face 10 of the end face sealing member 9 is dried in the same manner as in a method for manufacturing a plugged honeycomb structure of one embodiment of the first aspect of the invention, or an end face sealing member 9 constituted by a flammable substance may be used as the end face sealing member 9 to burn up the end face sealing member 9 when the plugged honeycomb structure precursor 18 (see FIG. 6) is fired. Incidentally, in the case that the end face sealing member 9 is burnt up upon firing the plugged honeycomb structure precursor 18 (see FIG. 6), the mask 19 (see FIG. 7) covering an opening of each of the cells other than the predetermined cells may be burnt up together with the end face sealing member 9 at the same time.

Further, in a plugged honeycomb structure of the present embodiment, a catalyst may be loaded on the internal surface and/or the inside of the partition walls 4 of a plugged honeycomb structure 1 as shown in FIG. 1.

Next, an embodiment of a plugged honeycomb structure of the present invention (third aspect of the invention) is described. A plugged honeycomb structure of the present invention (third aspect of the invention) is a plugged honeycomb structure manufactured by an embodiment of the first or second aspect of the invention (method for manufacturing a plugged honeycomb structure) described above. As shown in FIG. 1, a plugged honeycomb structure 1 of the present embodiment is provided with a cylindrical honeycomb structure 2 having porous partition walls 4 separating and forming a plurality of cells 5 functioning as fluid passages, and a plugging member 3 plugging an opening 6a of each of the predetermined cells 5a and the other opening 6a of each of the remaining cells 5b. In the plugged honeycomb structure, the plugging member 3 is unitarily constituted in every opening 6 of a cell 5 to be plugged independently, and the plugging member 3 has a flat end face on at least one end face 7a of the honeycomb structure 2 as shown in FIG. 2, or, even if a depression 8 toward inside the honeycomb structure 2 from one end face 7a is formed on an end face of the plugging member 3, the depth of the depression 8 is 1 mm or less. Since a plugged honeycomb structure 1 of the present embodiment has reduced accumulation of deposit on an end face thereof, it can suitably be used as a filter such as a DPF.

Figure 16:
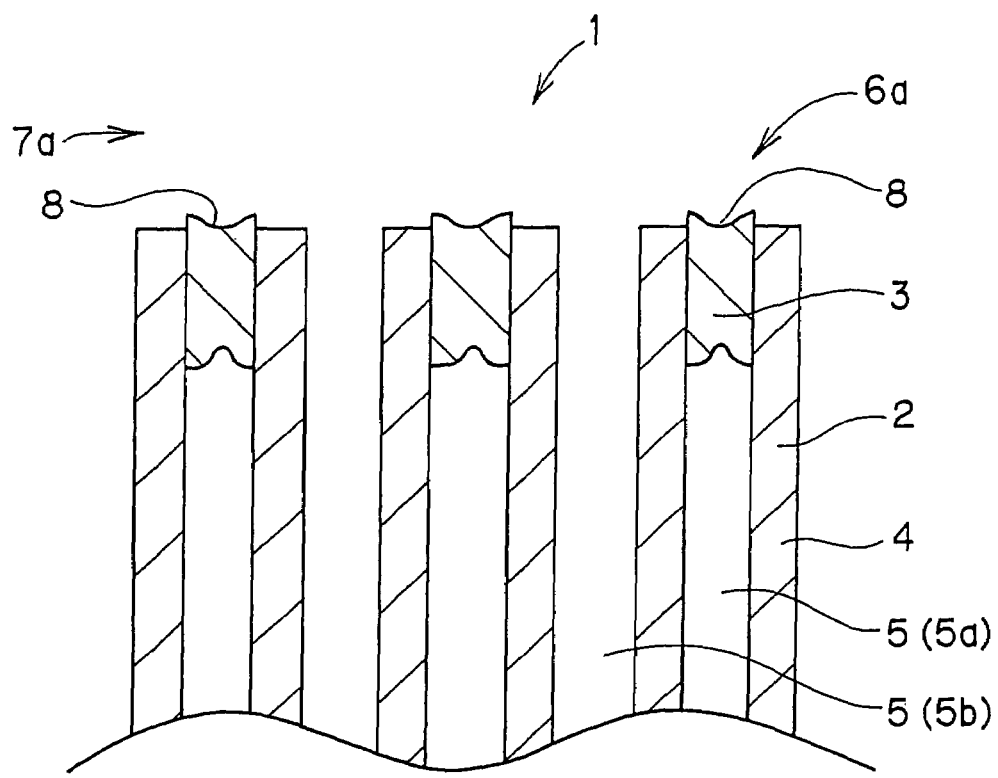
FIG. 16 is a sectional view showing another example of a section obtained by cutting a plugged honeycomb structure shown in FIG. 1 at the plane A including the central axis.
Figure 17:
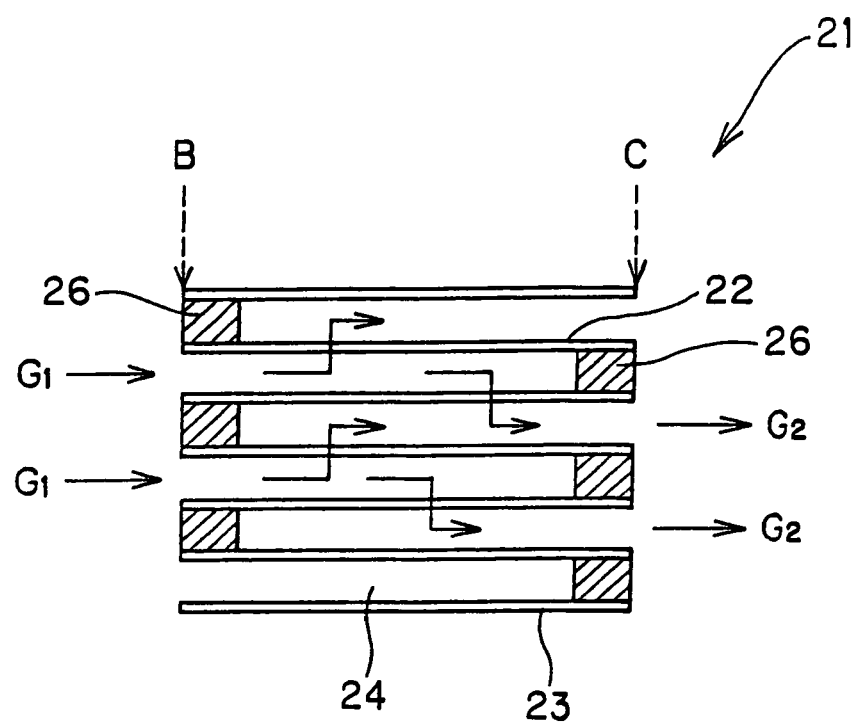
FIG. 17 is a sectional view showing a constitution of a conventional plugged honeycomb structure.

Though FIG. 3 shows a plugged honeycomb structure 1 in which a depression 8 depressed from one end face 7a of a honeycomb structure 2 toward inside the structure on an end face of the plugging member 3, the plugged honeycomb structure 1 may have a plugging member 3 protruding from an end face of the honeycomb structure 2 toward outside with a depression 8 depressed from one end face 7a of a honeycomb structure 2 toward inside on an end face of the plugging member 3. The depth of the depression 8 at this time is a depth from a portion protruding outermost of the plugging member 3 to a portion depressed toward inside. A plugging member 3 as shown in FIG. 16 is formed as a portion where a portion corresponding to a thickness of a mask protrudes in the case that the mask fir plugging is disposed on one end face 7a of the honeycomb structure 2.

Since a plugged honeycomb structure 1 of the present embodiment is manufactured by an embodiment (method for manufacturing a plugged honeycomb structure) of the first or second aspect of the invention described above as shown in FIGS. 2, 3, and 16, the plugging member 3 was formed by filling plugging slurry in the predetermined cells 5a at only once, and the plugging member 3 is unitarily constituted in every opening 6 of a cell 5 to be plugged independently, which imparts excellent thermal shock resistance to the plugged honeycomb structure 1. Therefore, a plugged honeycomb structure 1 of the present embodiment can suitably be used even in an environment having high temperature or a severe temperature change. In addition, a plugged honeycomb structure 1 of the present embodiment can be manufactured in a simple manufacture process at a low cost.

It is necessary that the partition wall 4 constituting a honeycomb structure 2 used in a plugged honeycomb structure 1 of the present embodiment is porous, and porous ceramic is suitably used as the material. There may suitably be used as the porous ceramic at least one kind selected from the group consisting of cordierite, mullite, alumina, spinel, silicon carbide, silicon nitride, lithium aluminum silicate, and aluminum titanate.

There is no particular limitation on a shape of the honeycomb structure 2, and the shape may be, for example, a columnar. A sectional shape (shape of an end face) perpendicular to the central axis of the columnar structure of the honeycomb structure 2 may be a polygon such as a rectangle, a circle, an oval, an ellipse, or a special shape. There is no particular limitation on a shape of the cells, and the shape may be a triangle, a rectangle, a hexagon, a circle, or the like. Incidentally, as the honeycomb structure 2 used as a plugged honeycomb structure 1 or the present embodiment, a honeycomb structure used as a conventionally known plugged honeycomb structure may suitably be used.

As a material for the plugging member 3, at least one kind of ceramic selected from the aforementioned group of preferable materials for the partition walls 4 can be used. In a plugged honeycomb structure 1 of the present embodiment, the plugging member 3 and the partition walls 4 may employ the same material or different materials.

In a plugged honeycomb structure 1 of the present embodiment, the plugging member 3 may be a porous body having pores formed by burning up a pore former. Specifically, it is preferable that plugging slurry containing a pore former is employed to form the plugging member 3 so as to give a porous body having pores formed by burning up the pore former in the firing step which is one of the manufacturing steps. The porous plugging member 3 can reduce a pressure loss of the honeycomb structure 1, which can particularly suitably used as a filter such as a DPF. A suitable example of such a pore former is a pore former described in an embodiment of the first aspect of the invention.

Incidentally, in a plugged honeycomb structure 1 of the present embodiment, the plugging member 2 has a flat end face on at least one end face 7a of the honeycomb structure 2 on the fluid inlet side or, it is satisfactory that, even if a depression toward inside the honeycomb structure 1 from one end face 7a is formed on the end face, the depth of the depression is 1 mm or less. For example, also on the other end face 7b side of the honeycomb structure 2, the plugging member 3 may have a flat end face or, even if a depression toward inside the honeycomb structure 1 from one end face 7a is formed on the end face, the depth of the depression may be 1 mm or less When a plugged honeycomb structure 1 is used as a filter such as a DPF, deposit usually accumulates on the inlet side face, that is, on one end face 7a. Therefore, it is sufficient that an end face of the plugging member 3 has the above constitution on one end face 7a side. However, an end face of the plugging member 3 may have the above constitution also on the other end face 7b.

In addition, in a plugged honeycomb structure 1 of the present embodiment, a catalyst may be loaded on the internal surface and/or the inside of the partition walls 4. Particularly, when a plugged honeycomb structure 1 is used as a DPF, the catalyst preferably has a function of accelerating combustion of deposit (particulate matter) trapped in the partition walls 4. Suitable examples of such a catalyst include noble metals such as Pt, Pd, and Rh and a nonmetal such as a perovskite type catalyst.

EXAMPLES

The present invention will hereinbelow be described more specifically with referring to Examples. However, the present invention is by no means limited to the following Examples.

In Examples and Comparative Example, a ceramic forming raw material was extruded to obtain a cylindrical unfired honeycomb structure having porous partition walls separating and forming a plurality of cells functioning as fluid passages. The unfired honeycomb structure obtained was fired to obtain a fired honeycomb structure. Plugging slurry containing ceramic was filled in an opening of each of the predetermined cells of the fired ceramic honeycomb structure and the other opening of each of the remaining cells to obtain a plugged honeycomb structure precursor. The plugged honeycomb structure precursor was fired to obtain a plugged honeycomb structure.

In Examples and Comparative Example, using, as the ceramic forming raw material, a raw material prepared by adding a binder, a dispersant, and water to a cordierite composition powder to give a mixture and kneading the mixture, a cylindrical plugged honeycomb structure having a circular end face shape having a diameter of 200 mm, a length of 200 mm, a square cell shape of 1.8 mm×1.8 mm, a partition wall thickness of 300 µm, and a cell density 0.3 cells/mm$^2$ was manufactured. This plugged honeycomb structure had a plug depth of 10 mm.

Incidentally, the plugging slurry used in the following Examples and Comparative Example was prepared by mixing a binder, a dispersant, and water to a cordierite composition powder, and the slurry viscosity was adjusted to 200 dPa·s.

Example 1

In Example I, when plugging slurry was filled in an opening of each of the predetermined cells of the honeycomb structure, a mask covering an opening of each of the cells other than the predetermined cells was disposed on an end face of the honeycomb structure to obtain a masked honeycomb structure. One end face of the masked honeycomb structure obtained was pressed against the end face sealing member 9 constituted by aluminum foil and having a predetermined amount of plugging slurry thereon to fill the plugging slurry in the predetermined cells on one end side, and at least the plugging slurry at a portion in contact with the end face sealing member is dried in a state that the end face sealing member is pressed against the one end face of the masked honeycomb structure to obtain the plugged honeycomb structure precursor.

Example 2

In Example 2, the plugged honeycomb structure was manufactured in the same manner as in Example 1 except that a polyethylene film was used as an end face sealing member.

Comparative Example 1

In Comparative Example 1, when plugging slurry was filled in an opening of each of the predetermined cells of the honeycomb structure, a masked honeycomb structure was pressed against a container containing a large amount of plugging slurry to fill the plugging slurry in an opening of each of the predetermined cells. Then, the masked honeycomb structure was taken out from the container in the state that the plugging slurry was filled in the opening of each of the predetermined cells to obtain a plugged honeycomb structure precursor, and the plugged honeycomb structure precursor was dried and fired to manufacture a plugged honeycomb structure.

(Examination)

The plugged honeycomb structure precursor manufactured in a method shown in Comparative Example had shrink dents having a depth of 1 mm or more on almost all the face on the plugging member end face side, and shrink dents having a depth of 1 mm or more remained on all the face even after firing; while the plugged honeycomb structure precursor manufactured in a method shown in Example 1 or Example 2 had a few small holes having a depth of 1 mm or less after drying, and it was similar even after firing, and thus good results were obtained.

Since a plugged honeycomb structure of the present invention can reduce accumulation of deposit on an end face thereof, it can suitably be used as a filter such as a DPF. In addition, a method for manufacturing a plugged honeycomb structure of the present invention can manufacture such a plugged honeycomb structure simply at a low cost.

What is claimed is:

1. A method for manufacturing a plugged honeycomb structure comprising the steps of:

subjecting a ceramic forming raw material to extrusion forming to obtain a cylindrical unfired honeycomb structure having porous partition walls separating and forming a plurality of cells functioning as fluid passages, filling plugging slurry containing ceramic in one opening of each of predetermined cells of the unfired honeycomb structure or a fired honeycomb structure obtained by firing the unfired honeycomb structure and in the other opening of each of the remaining cells to obtain a plugged honeycomb structure precursor, and firing the plugged honeycomb structure precursor to obtain a plugged honeycomb structure;

wherein a mask covering the opening of each of cells other than the predetermined cells is disposed on one end face of the unfired honeycomb structure or the fired honeycomb structure at least when the plugging slurry is filled in one opening of each of the predetermined cells of the unfired honeycomb structure or the fired honeycomb structure to obtain a masked honeycomb structure, a predetermined amount of the plugging slurry is applied on a face of an end face sealing member having a predetermined face size and limiting motion of the plugging slurry inside the predetermined cells by bringing the face into contact with the one end face of the masked honeycomb structure when the plugging slurry is filled in the opening of each of the predetermined cells, and the one end face of the masked honeycomb structure is pressed against the face to which the plugging slurry was applied of the end face sealing member to fill the plugging slurry in the predetermined cells on the one end face side, and at least the plugging slurry at a portion in contact with the face of the end face sealing member is dried in a state that the face of the end face sealing member is pressed against the one end face of the masked honeycomb structure to obtain the plugged honeycomb structure precursor.

2. A method for manufacturing a plugged honeycomb structure comprising the steps of:

subjecting a ceramic forming raw material to extrusion forming to obtain a cylindrical unfired honeycomb structure having porous partition walls separating and forming a plurality of cells functioning as fluid passages, filling plugging slurry containing ceramic in one opening of each of predetermined cells of the unfired honeycomb structure or a fired honeycomb structure obtained by firing the unfired honeycomb structure and in the other opening of each of the remaining cells to obtain a plugged honeycomb structure precursor, and firing the plugged honeycomb structure precursor to obtain a plugged honeycomb structure;

wherein a mask covering the opening of each of cells other than the predetermined cells is disposed on one end face of the unfired honeycomb structure or the fired honeycomb structure at least when the plugging slurry is filled in one opening of each of the predetermined cells of the unfired honeycomb structure or the fired honeycomb structure to obtain a masked honeycomb structure, and after the plugging slurry is filled in the predetermined cells on the one end face side in the masked honeycomb structure, at least the plugging slurry at a portion in contact with the face of an end face sealing member is dried in a state that the face of the end face sealing member having a predetermined face size and limiting motion of the plugging slurry inside the predetermined cells by bringing the face into contact with the one end face of the masked honeycomb structure is pressed against the one end face of the masked honeycomb structure to obtain the plugged honeycomb structure precursor.

3. A method for manufacturing a plugged honeycomb structure according to claim 1, wherein the end face sealing member is removed from the plugged honeycomb structure precursor after the plugging slurry at a portion in contact with the face of the end face sealing member is dried.

4. A method for manufacturing a plugged honeycomb structure according to claim 2, wherein the end face sealing member is removed from the plugged honeycomb structure precursor after the plugging slurry at a portion in contact with the face of the end face sealing member is dried.

5. A method for manufacturing a plugged honeycomb structure according to claim 1, wherein the end face sealing member is burnt up using the end face sealing member constituted by a flammable substance when the plugged honeycomb structure precursor is fired.

6. A method for manufacturing a plugged honeycomb structure according to claim 2, wherein the end face sealing member is burnt up using the end face sealing member constituted by a flammable substance when the plugged honeycomb structure precursor is fired.

7. A method for manufacturing a plugged honeycomb structure according to claim 5, wherein the mask covering the opening of each of the cells other than the predetermined cells is burnt up together with the end face sealing member when the plugged honeycomb structure precursor is fired.

8. A method for manufacturing a plugged honeycomb structure according to claim 6, wherein the mask covering the opening of each of the cells other than the predetermined cells is burnt up together with the end face sealing member when the plugged honeycomb structure precursor is fired.

9. A method for manufacturing a plugged honeycomb structure according to claim 1, wherein the end face sealing member has flexibility and a shape of a sheet.

10. A method for manufacturing a plugged honeycomb structure according to claim 2, wherein the end face sealing member has flexibility and a shape of a sheet.

11. A method for manufacturing a plugged honeycomb structure according to claim 1, wherein the end face sealing member has a bottomed cylindrical shape with an open top face.

12. A method for manufacturing a plugged honeycomb structure according to claim 2, wherein the end face sealing member has a bottomed cylindrical shape with an open top face.

13. A method for manufacturing a plugged honeycomb structure according to claim 1, wherein the plugging slurry contains a pore former.

14. A method for manufacturing a plugged honeycomb structure according to claim 2, wherein the plugging slurry contains a pore former.

15. A method for manufacturing a plugged honeycomb structure according to claim 1, wherein the plugging slurry has a viscosity of 100 to 1500 dPa·s.

16. A method for manufacturing a plugged honeycomb structure according to claim 2, wherein the plugging slurry has a viscosity of 100 to 1500 dPa·s.

* * * * *